(12) United States Patent
Shellhammer et al.

(10) Patent No.: US 8,964,692 B2
(45) Date of Patent: Feb. 24, 2015

(54) SPECTRUM SENSING OF BLUETOOTH USING A SEQUENCE OF ENERGY DETECTION MEASUREMENTS

(75) Inventors: Stephen J. Shellhammer, Ramona, CA (US); Richard Van Nee, De Meern (NL)

(73) Assignee: QUALCOMM Incorporated, San Diego, CA (US)

( * ) Notice: Subject to any disclaimer, the term of this patent is extended or adjusted under 35 U.S.C. 154(b) by 343 days.

(21) Appl. No.: 12/612,749

(22) Filed: Nov. 5, 2009

(65) Prior Publication Data

US 2010/0118695 A1 May 13, 2010

Related U.S. Application Data

(60) Provisional application No. 61/113,088, filed on Nov. 10, 2008.

(51) Int. Cl.
*H04W 4/00* (2009.01)
*H04W 16/14* (2009.01)
*H04W 8/00* (2009.01)

(52) U.S. Cl.
CPC .............. *H04W 16/14* (2013.01); *H04W 8/005* (2013.01)
USPC ........ 370/331; 370/395.5; 370/461; 370/225; 370/328; 455/13.3; 455/16

(58) Field of Classification Search
None
See application file for complete search history.

(56) References Cited

U.S. PATENT DOCUMENTS

| | | | |
|---|---|---|---|
| 4,901,307 A | 2/1990 | Gilhousen et al. | |
| 5,056,109 A | 10/1991 | Gilhousen et al. | |
| 5,101,501 A | 3/1992 | Gilhousen et al. | |
| 5,103,459 A | 4/1992 | Gilhousen et al. | |
| 5,109,390 A | 4/1992 | Gilhousen et al. | |
| 5,182,753 A | 1/1993 | Dahlin et al. | |
| 5,224,121 A | 6/1993 | Schorman | |
| 5,267,261 A | 11/1993 | Blakeney, II et al. | |
| 5,285,447 A | 2/1994 | Hulsebosch | |
| 5,414,796 A | 5/1995 | Jacobs et al. | |
| 5,418,839 A | 5/1995 | Knuth et al. | |
| 5,420,850 A | 5/1995 | Umeda et al. | |
| 5,450,621 A | 9/1995 | Kianush et al. | |
| 5,457,816 A | 10/1995 | Koyama | |
| 5,471,503 A | 11/1995 | Altmaier et al. | |

(Continued)

FOREIGN PATENT DOCUMENTS

| | | |
|---|---|---|
| EP | 0530165 A2 | 3/1993 |
| EP | 0548939 A2 | 6/1993 |

(Continued)

OTHER PUBLICATIONS

Polepalli B. et al., "Impact of IEEE 802.11n Operation on IEEE 802.15.4 Operation", International Conference on Advanced Information Networking and Applications Workshops, 2009, pp. 328-333, IEEE Computer Society.

(Continued)

*Primary Examiner* — Huy D Vu
*Assistant Examiner* — Zewdu A Beyen
(74) *Attorney, Agent, or Firm* — Eric Ho

(57) ABSTRACT

Certain aspects of the present disclosure provide techniques for detecting presence of a Bluetooth device in the vicinity of a WiFi device by sensing the spectrum of the Bluetooth device using a sequence of energy detection measurements, generating a test statistic based on the measurements and comparing the test statistic to a threshold.

40 Claims, 14 Drawing Sheets

(56) References Cited

U.S. PATENT DOCUMENTS

| | | |
|---|---|---|
| 5,483,063 A | 1/1996 | Hall, Jr. et al. |
| 5,490,165 A | 2/1996 | Blakeney, II et al. |
| 5,546,464 A | 8/1996 | Raith et al. |
| 5,594,718 A | 1/1997 | Weaver, Jr. et al. |
| 5,625,876 A | 4/1997 | Gilhousen et al. |
| 5,627,876 A | 5/1997 | Moon |
| 5,697,055 A | 12/1997 | Gilhousen et al. |
| 5,701,294 A | 12/1997 | Ward et al. |
| 5,706,315 A | 1/1998 | Ogoro |
| 5,727,033 A | 3/1998 | Weaver et al. |
| 5,751,725 A | 5/1998 | Chen |
| 5,805,648 A | 9/1998 | Sutton |
| 5,848,063 A | 12/1998 | Weaver, Jr. et al. |
| 5,883,899 A | 3/1999 | Dahlman et al. |
| 5,896,368 A | 4/1999 | Dahlman et al. |
| 5,903,550 A | 5/1999 | Spock |
| 5,920,554 A | 7/1999 | Nakamura et al. |
| 5,930,706 A | 7/1999 | Raith |
| 5,936,961 A | 8/1999 | Chiodini et al. |
| 5,937,019 A | 8/1999 | Padovani |
| 5,946,605 A | 8/1999 | Takahisa et al. |
| 5,950,131 A | 9/1999 | Vilmur |
| 5,953,324 A | 9/1999 | Adachi |
| 5,953,325 A | 9/1999 | Willars |
| 5,956,367 A | 9/1999 | Koo et al. |
| 5,963,870 A | 10/1999 | Chheda et al. |
| 5,982,760 A | 11/1999 | Chen |
| 5,995,836 A | 11/1999 | Wijk et al. |
| 5,999,816 A | 12/1999 | Tiedemann, Jr. et al. |
| 6,047,165 A | 4/2000 | Wright et al. |
| 6,073,021 A | 6/2000 | Kumar et al. |
| 6,073,025 A | 6/2000 | Chheda et al. |
| 6,075,974 A | 6/2000 | Saints et al. |
| 6,075,989 A | 6/2000 | Moore et al. |
| 6,078,570 A | 6/2000 | Czaja et al. |
| 6,101,175 A | 8/2000 | Schorman et al. |
| 6,118,498 A | 9/2000 | Reitmeier |
| 6,125,267 A | 9/2000 | Monge-Navarro et al. |
| 6,128,493 A | 10/2000 | Song |
| 6,134,440 A | 10/2000 | Black |
| 6,144,649 A | 11/2000 | Storm et al. |
| 6,147,983 A | 11/2000 | Backstrom |
| 6,151,502 A | 11/2000 | Padovani et al. |
| 6,154,659 A | 11/2000 | Jalali et al. |
| 6,157,835 A | 12/2000 | Findikli et al. |
| 6,175,561 B1 | 1/2001 | Storm et al. |
| 6,181,943 B1 | 1/2001 | Kuo et al. |
| 6,185,431 B1 | 2/2001 | Li et al. |
| 6,188,900 B1 | 2/2001 | Ruiz et al. |
| 6,212,368 B1 | 4/2001 | Ramesh et al. |
| 6,233,466 B1* | 5/2001 | Wong et al. ............ 455/562.1 |
| 6,252,861 B1 | 6/2001 | Bernstein et al. |
| 6,304,755 B1 | 10/2001 | Tiedemann, Jr. et al. |
| 6,310,869 B1 | 10/2001 | Holtzman et al. |
| 6,314,126 B1 | 11/2001 | Schilling et al. |
| 6,334,047 B1 | 12/2001 | Andersson et al. |
| 6,370,367 B1 | 4/2002 | Monge-Navarro et al. |
| 6,381,461 B1 | 4/2002 | Besson et al. |
| 6,385,437 B1 | 5/2002 | Park et al. |
| 6,385,455 B1 | 5/2002 | St. Clair et al. |
| 6,396,804 B2 | 5/2002 | Odenwalder |
| 6,396,820 B1 | 5/2002 | Dolan et al. |
| 6,493,333 B1 | 12/2002 | Kim et al. |
| 6,535,563 B2 | 3/2003 | Tiedemann, Jr. et al. |
| 6,553,064 B1 | 4/2003 | Chen et al. |
| 6,553,229 B1* | 4/2003 | Dent ............................ 455/434 |
| 6,563,807 B1 | 5/2003 | Kim et al. |
| 6,587,446 B2 | 7/2003 | Sarkar et al. |
| 6,597,922 B1 | 7/2003 | Ling et al. |
| 6,603,751 B1 | 8/2003 | Odenwalder |
| 6,611,506 B1 | 8/2003 | Huang et al. |
| 6,665,308 B1 | 12/2003 | Rakib et al. |
| 6,701,130 B1 | 3/2004 | Hamalainen et al. |
| 6,788,748 B2 | 9/2004 | Chen et al. |
| 6,865,173 B1 | 3/2005 | Czaja et al. |
| 6,879,576 B1 | 4/2005 | Agrawal et al. |
| 7,010,068 B2 | 3/2006 | Tiedemann, Jr. et al. |
| 7,177,377 B2 | 2/2007 | Wu et al. |
| 7,190,688 B1 | 3/2007 | Kamel et al. |
| 7,215,976 B2* | 5/2007 | Brideglall ............... 455/552.1 |
| 7,242,935 B2 | 7/2007 | Odenwalder |
| 7,245,597 B2 | 7/2007 | Grilli et al. |
| 7,292,435 B2 | 11/2007 | She |
| 7,502,619 B1 | 3/2009 | Katz |
| 7,603,123 B2 | 10/2009 | Odenwalder |
| 7,653,157 B2 | 1/2010 | Tiedemann, Jr. et al. |
| 7,664,209 B2 | 2/2010 | Tiedemann, Jr. et al. |
| 8,170,558 B2 | 5/2012 | Odenwalder |
| 8,199,716 B2 | 6/2012 | Grilli et al. |
| 2002/0082019 A1 | 6/2002 | Sunay et al. |
| 2003/0194033 A1 | 10/2003 | Tiedemann, Jr. et al. |
| 2004/0063403 A1 | 4/2004 | Durrant |
| 2005/0095986 A1* | 5/2005 | Hassan et al. ............ 455/67.13 |
| 2006/0146869 A1 | 7/2006 | Zhang et al. |
| 2006/0171327 A1 | 8/2006 | Durand et al. |
| 2008/0151849 A1 | 6/2008 | Utsunomiya et al. |
| 2009/0112492 A1 | 4/2009 | Ibrahim et al. |

FOREIGN PATENT DOCUMENTS

| | | |
|---|---|---|
| EP | 0566551 A2 | 10/1993 |
| EP | 0576079 A1 | 12/1993 |
| EP | 0667726 A2 | 8/1995 |
| EP | 0748140 A2 | 12/1996 |
| EP | 0773695 A1 | 5/1997 |
| EP | 0809365 A1 | 11/1997 |
| EP | 0977393 A1 | 2/2000 |
| EP | 1076956 | 5/2006 |
| EP | 1509057 | 7/2007 |
| EP | 1509058 | 8/2007 |
| GB | 2314734 A | 1/1998 |
| JP | 06252819 A | 9/1994 |
| JP | 8009457 A | 1/1996 |
| JP | 08500475 | 1/1996 |
| JP | 8503591 | 4/1996 |
| JP | 8237220 A | 9/1996 |
| JP | 09018927 | 1/1997 |
| JP | 09064814 | 3/1997 |
| JP | 9083429 A | 3/1997 |
| JP | 9307942 | 11/1997 |
| JP | 10051834 | 2/1998 |
| JP | 2008517566 A | 5/2008 |
| JP | 2011027694 A | 2/2011 |
| RU | 2127963 C1 | 3/1999 |
| WO | 9429980 A1 | 12/1994 |
| WO | 9429981 A1 | 12/1994 |
| WO | 9508237 A1 | 3/1995 |
| WO | 9616524 | 5/1996 |
| WO | 9623369 A1 | 8/1996 |
| WO | 9626616 A1 | 8/1996 |
| WO | 9631078 A1 | 10/1996 |
| WO | 9638999 A1 | 12/1996 |
| WO | 9702668 A1 | 1/1997 |
| WO | 9729611 A1 | 8/1997 |
| WO | 9740592 A1 | 10/1997 |
| WO | 9740593 A1 | 10/1997 |
| WO | 9740792 A1 | 11/1997 |
| WO | 9819491 A2 | 5/1998 |
| WO | 9836507 A1 | 8/1998 |
| WO | 9836607 | 8/1998 |
| WO | 9847253 A1 | 10/1998 |
| WO | 9938347 | 7/1999 |
| WO | 9941934 | 8/1999 |
| WO | 9957649 A2 | 11/1999 |
| WO | 9960733 A1 | 11/1999 |
| WO | 0070902 | 11/2000 |
| WO | 9957849 | 11/2000 |
| WO | WO2006045097 | 4/2006 |

(56) References Cited

FOREIGN PATENT DOCUMENTS

| WO | WO2006082379 | 8/2006 |
|----|--------------|--------|
| WO | 2007135639 A1 | 11/2007 |

OTHER PUBLICATIONS

Devin Akin: "802.11n 20/40 MHz BSS Mode Rules" Internet Citation Aug. 29, 2007, pp. 1-2, XP002511494.

IEEE: "IEEE P802.11n?/D2.00 Draft Standard for Information Technology—Telecommunications and information exchange between systems—Local and metropolitan area networks—Specific requirements—Part 11: Wireless LAN Medium Access Control (MAC) and Physical Layer (PHY) specifications:" Internet Citation Feb. 1, 2007, pp. 199-202, XP002511493.

International Search Report and Written Opinion—PCT/US2009/063626, International Searching Authority—European Patent Office, Mar. 29, 2010.

J.R. Barr—Motorola Inc.: "Additional 40 MHz Scanning Proposal" IEEE 802.11-08/1101 R4, [Online] Oct. 6, 2008, pp. 1-23, XP002572008 INET Internet.

Taiwan Search Report—TW098138158—TIPO—Dec. 5, 2012.

3GPP Specification detail; "General Packet Radio Service (GPRS); Mobile Station (MS)—Base Station System (BSS) interface; Radio Link Control/Medium Access Control (RLC/MAC) protocol;" Mar. 20, 1998.

Andermo, PG , Editor, "CODIT Final Review Report," Nov. 21, 1995, pp. 1-7, 10-12, 21-25, 46-49, & 76-87, Issue 2.0.

Baier A, et al., "Design Study for a CDMA-Based Third-Generation Mobile Radio Station System," May 1994, IEEE Journal on Selected Areas in Communications, vol. 12, No. 4, pp. 733-743.

ETSI, "Digital Cellular Telecommunications System; Multiband Operation of GSM/DC 1 800 by a Singel Operator (GSM 03.26 version 5.2.0)", ETSI Technical Report 366, 3rd Ed., Nov. 1997, pp. 1-17.

ETSI, "Digital Cellular Telecommunications System; (Phase 2+);Technical Realization of the Short Message Service (SMS); Point-to-Point (PP) (GSM 03.40 version 5.6.0)", ETSI Technical Report Draft, ETS 300 901, 3rd Ed., Aug. 1997, pp. 1, 13-14.

ETSI EN (04.60); "Digital cellular telecommunications system (Phase 2+); General Packet Radio Service (GPRS); Mobile Station (MS)—Base Station System (BSS) interface; Radio Link Control/Medium Access Control (RLC/MAC) protocol (GSM 04.60 version 6.0.0);" Mar. 1998; pp. 1 & 38-43; European Telecommunicaitons Standards Institute; Sophia Antipolis, Valbonne, France.

Gustafsson et al., "Compressed Mode Techniques for Inter-Frequency Measurements in a Wide-band DSCDMA System", Waves of the Year 2000+ PIMRC. The IEEE International Symposium on Personal, Indoor and Mobile Radio Communications., 1997, pp. 231-235, IEEE.

Ojanpera T et al., "Wideband CDMA for Third Generation Mobile Communications" Jun. 2000, People Posts & Telecommunications Publishing House, Bejing, pp. 170-209 and 275-285.

Ojanpera, T., et al., "Wideband CDMA for Third Generations Mobile Communications", Text Book, 1998.

Satarasinghe P, "A Novel Method for CDMA Hard Handoff", IEEE, Globecom 1996, London, Nov. 18-22,vol. 3, Nov. 18, 1996, pp. 1766-1768.

Simon, et al., "Spread Spectrum Communications Handbook," Revised Edition, McGraw-Hill, 1994, ISBN 0-07-057629-7, pp. 11-12.

TIA/EIA Interim Standard IS-95-A Mobile Station-Base Station Compatibility Standard for Dual-Mode Wideband Spread Spectrum Cellular System. May 1995.

* cited by examiner

SPECTRUM SENSING OF BLUETOOTH USING A SEQUENCE OF ENERGY DETECTION MEASUREMENTS

CLAIM OF PRIORITY UNDER 35 U.S.C. §119

The present application for patent claims benefit of U.S. Provisional Patent Application Ser. No. 61/113,088 filed Nov. 10, 2008, entitled, "Spectrum Sensing of Bluetooth using a Sequence of Energy Detection Measurements," and assigned to the assignee hereof and hereby expressly incorporated by reference herein.

TECHNICAL FIELD

Certain embodiments of the present disclosure generally relate to wireless communications and, more particularly, to detecting a Bluetooth device using a sequence of energy detection measurements.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3GPP Long Term Evolution (LTE) systems, and orthogonal frequency division multiple access (OFDMA) systems, IEEE 802.11 carrier sense multiple access/collision avoidance (CSMA/CA) and Bluetooth frequency hopping spread spectrum (FHSS) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input-single-output, multiple-input-single-output or a multiple-input-multiple-output (MIMO) system.

The Institute of Electrical and Electronic Engineers (IEEE) 802.11 working group has been developing an amendment for a high-throughput physical layer (PHY), called 802.11n. The IEEE 802.11n standard includes two bandwidths, an original 20 MHz and a new optional 40 MHz. There have been numerous concerns about the effect of the 40 MHz version of the IEEE 802.11n on other wireless networks, such as Bluetooth operating in the 2.4 GHz frequency band.

SUMMARY

Certain embodiments of the present disclosure provide a method for detecting the presence, in a first radio access technology (RAT) network, of a device that communicates via a second RAT. The method generally includes estimating a plurality of received power values of transmissions via the second RAT at a plurality of time steps during a network quiet time of the first RAT network to generate a first set of received power values, calculating a first test statistic based on the first set of received power values, comparing the first test statistic with a first threshold to determine if the device that communicates via the second RAT is in range, and in response to detecting the device that communicates via the second RAT in range, switching from a first operational frequency to a second operational frequency.

Certain embodiments of the present disclosure provide an apparatus for detecting the presence, in a first radio access technology (RAT) network, of a device that communicates via a second RAT. The apparatus generally includes means for estimating a plurality of received power values of transmissions via the second RAT at a plurality of time steps during a network quiet time of the first RAT network to generate a first set of received power values, means for calculating a first test statistic based on the first set of received power values, means for comparing the first test statistic with a first threshold to determine if the device that communicates via the second RAT is in range, and in response to detecting the device that communicates via the second RAT in range, means for switching from a first operational frequency to a second operational frequency.

Certain embodiments of the present disclosure provide an apparatus for detecting the presence, in a first radio access technology (RAT) network, of a device that communicates via a second RAT. The apparatus generally includes logic for estimating a plurality of received power values of transmissions via the second RAT at a plurality of time steps during a network quiet time of the first RAT network to generate a first set of received power values, logic for calculating a first test statistic based on the first set of received power values, logic for comparing the first test statistic with a first threshold to determine if the device that communicates via the second RAT is in range, and in response to detecting the device that communicates via the second RAT in range, logic for switching from a first operational frequency to a second operational frequency.

Certain embodiments of the present disclosure provide a computer-program product for detecting the presence, in a first radio access technology (RAT) network, of a device that communicates via a second RAT, comprising a computer readable medium having instructions stored thereon, the instructions being executable by one or more processors. The instructions generally include instructions for estimating a plurality of received power values of transmissions via the second RAT at a plurality of time steps during a network quiet time of the first RAT network to generate a first set of received power values, instructions for calculating a first test statistic based on the first set of received power values, instructions for comparing the first test statistic with a first threshold to determine if the device that communicates via the second RAT is in range, and in response to detecting the device that communicates via the second RAT in range, instructions for switching from a first operational frequency to a second operational frequency.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Certain embodiments of the present disclosure, propose a method to reliably detect the presence of a Bluetooth device in close proximity to a station using energy detection measurements. Certain embodiments propose a method to eliminate instances of false detection because of other lower power signals from other nearby networks, such as a Wi-Fi network.

Various aspects of certain aspects of the present disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect described herein as "exemplary" is not necessarily to be construed as preferred or advantageous over other aspects. Also as used herein, the term "legacy stations" generally refers to wireless network nodes that support 802.11n or earlier versions of the IEEE 802.11 standard.

The multi-antenna transmission techniques described herein may be used in combination with various wireless technologies such as Code Division Multiple Access (CDMA), Orthogonal Frequency Division Multiplexing (OFDM), Time Division Multiple Access (TDMA), Spatial Division Multiple Access (SDMA), and so on. Multiple user terminals can concurrently transmit/receive data via different (1) orthogonal code channels for CDMA, (2) time slots for TDMA, or (3) sub-bands for OFDM. A CDMA system may implement IS-2000, IS-95, IS-856, Wideband-CDMA (W-CDMA), or some other standards. An OFDM system may implement IEEE 802.11 or some other standards. A TDMA system may implement GSM or some other standards. These various standards are known in the art.

An Example MIMO System

Figure 1:
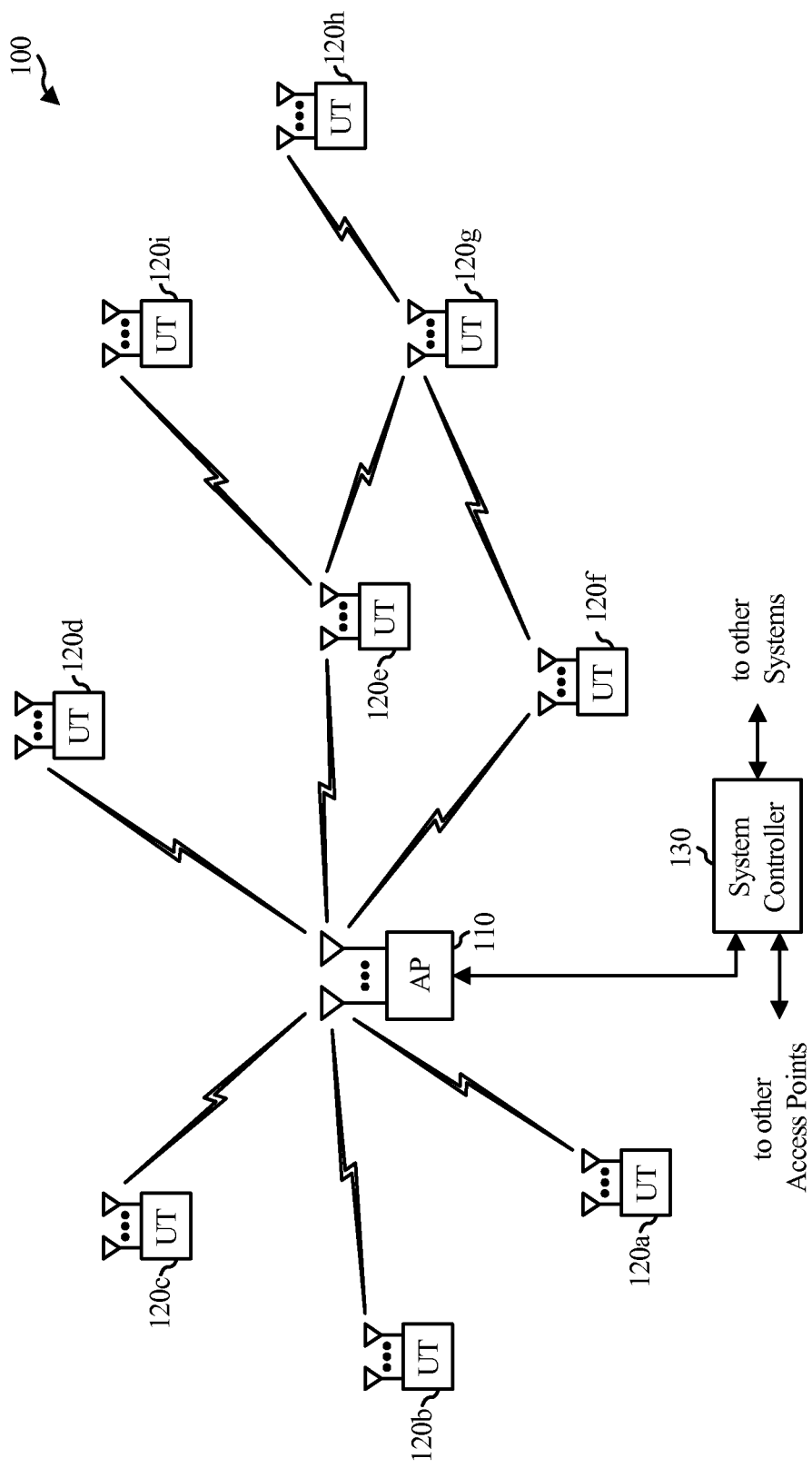
FIG. 1 illustrates an example wireless communication system, in accordance with certain embodiments of the present disclosure.

FIG. 1 illustrates a multiple-access MIMO system 100 with access points and user terminals. For simplicity, only one access point 110 is shown in FIG. 1. An access point (AP) is generally a fixed station that communicates with the user terminals and may also be referred to as a base station or some other terminology. According to certain aspects, an AP may be a "soft-AP" comprising a mobile device that implements AP functionality, possibly while still serving as a client in some circumstances. A user terminal may be fixed or mobile and may also be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

System 100 employs multiple transmit and multiple receive antennas for data transmission on the downlink and uplink. Access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. In certain cases, it may be desirable to have $N_{ap} \geq N_u \geq 1$ if the data symbol streams for the $N_u$ user terminals are not multiplexed in code, frequency, or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and/or receives user-specific data from the access point. In general, each selected user terminal may be equipped with one or multiple antennas (i.e., $N_{ut} \geq 1$). The $N_u$ selected user terminals can have the same or different number of antennas.

MIMO system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported).

Figure 2:
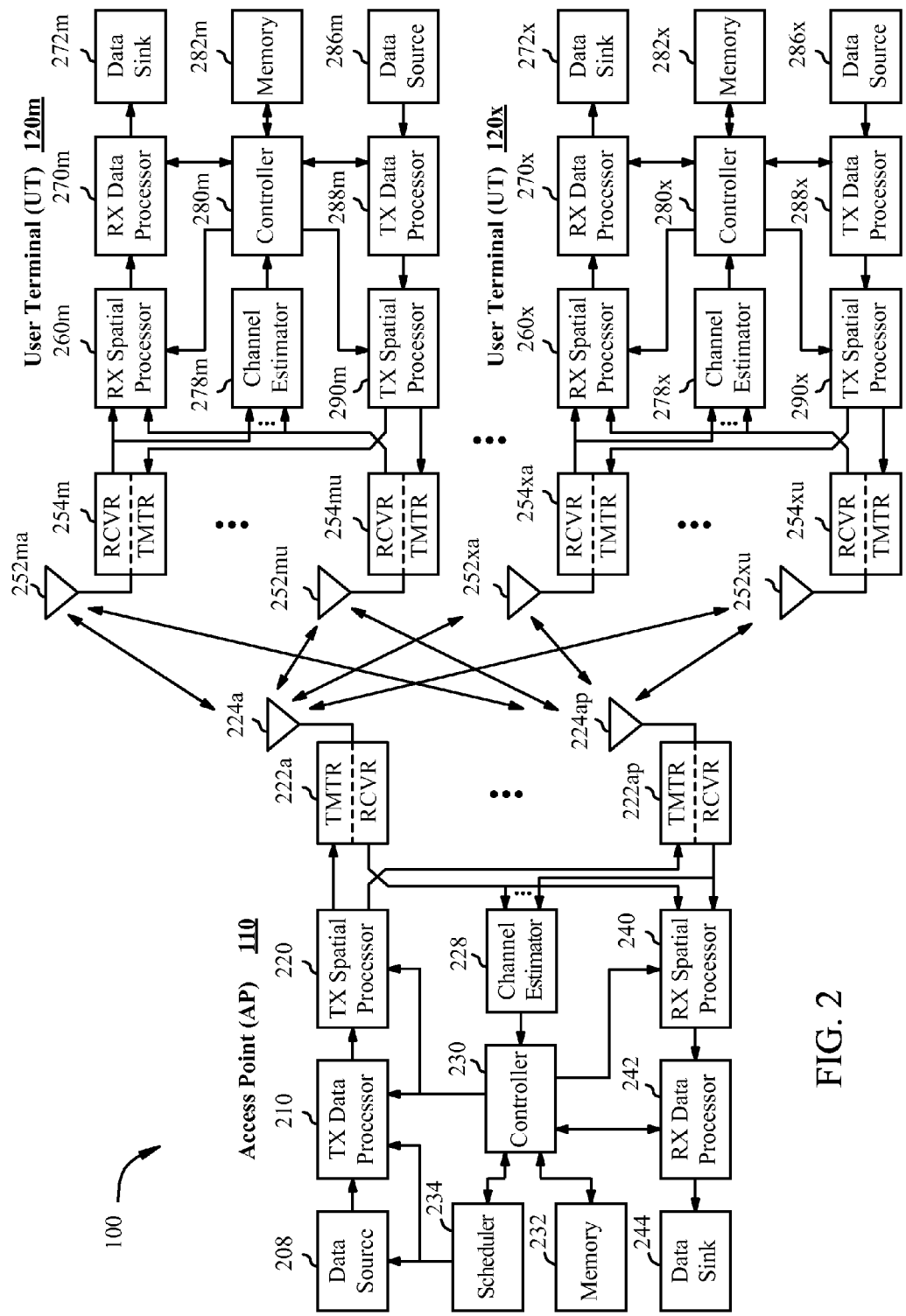
FIG. 2 illustrates various components that may be utilized in a wireless device in accordance with certain embodiments of the present disclosure.

FIG. 2 shows a block diagram of access point 110 and two user terminals 120m and 120x in MIMO system 100. Access point 110 is equipped with $N_{ap}$ antennas 224a through 224ap. User terminal 120m is equipped with $N_{ut,m}$ antennas 252ma through 252mu, and user terminal 120x is equipped with $N_{ut,x}$ antennas 252xa through 252xu. Access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point 110.

At access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{s_{up,m}\}$ is an estimate of a data symbol stream $\{s_{up,m}\}$ transmitted by a respective user terminal. An RX data processor 242 processes (e.g., demodulates, deinterleaves, and decodes) each recovered uplink data symbol stream $\{s_{up,m}\}$ in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. $N_{ap}$ transmitter units 222 provide $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

At each user terminal 120, $N_{ut,m}$ antennas 252 receive the $N_{ap}$ downlink signals from access point 110. Each receiver unit (RCVR) 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream $\{s_{dn,m}\}$ for the user terminal. The receiver spatial processing is performed in accordance with the CCMI, MMSE, or some other technique. An RX data processor 270 processes (e.g., demodulates, deinterleaves, and decodes) the recovered downlink data symbol stream to obtain decoded data for the user terminal.

Figure 3:
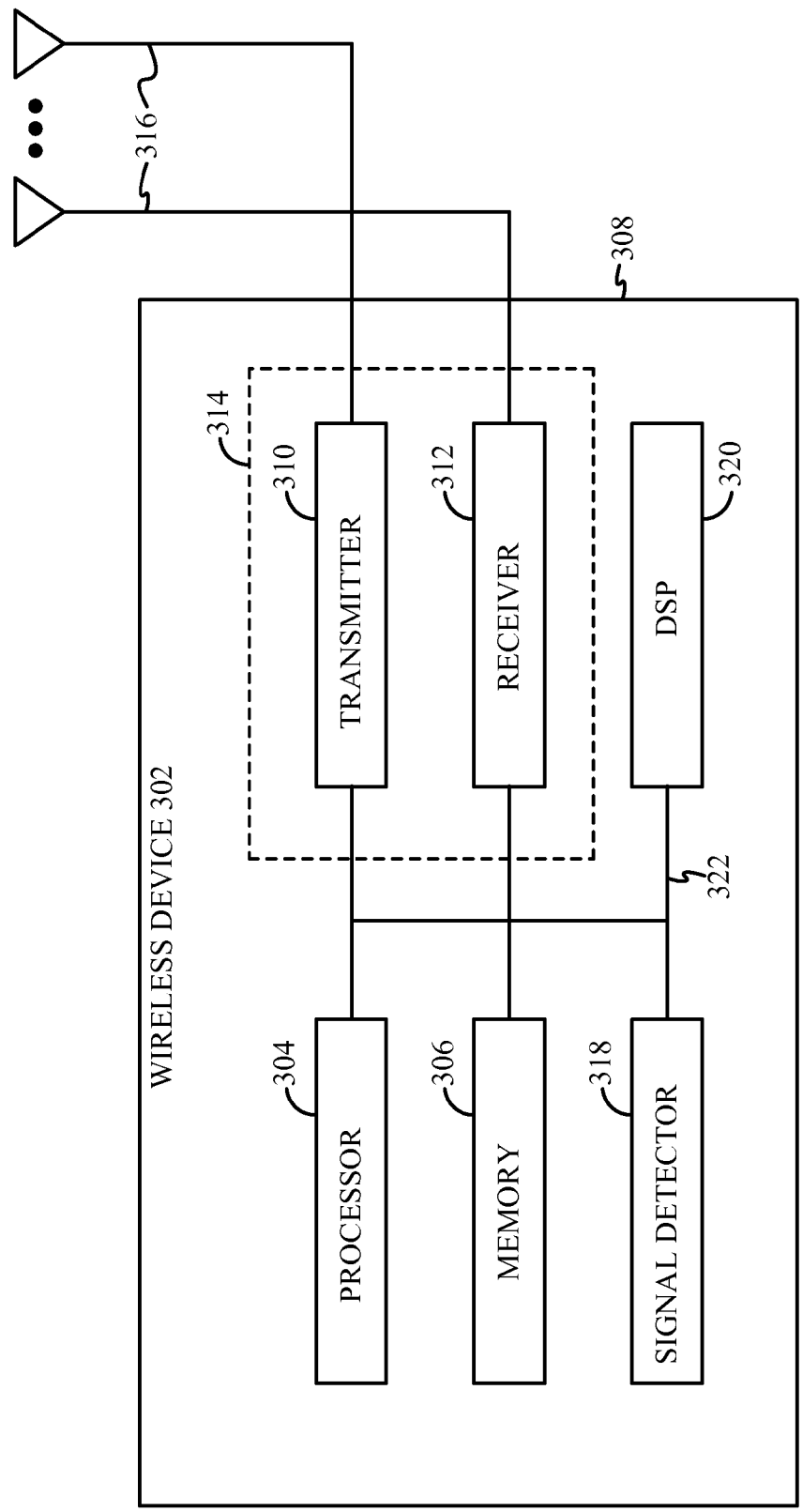
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates various components that may be utilized in a wireless device 302 that may be employed within the system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Certain embodiments of the present disclosure, propose a method to reliably detect presence of a Bluetooth device in close proximity to a wireless station using energy detection measurements. Certain embodiments propose a method to eliminate instances of false detection because of other lower power signals from other nearby networks, such as a Wi-Fi network.

For certain embodiments, an 802.11n station (i.e., a Wi-Fi station) may scan a channel to determine if there is a Bluetooth device operating in close proximity. The station may generate a metric based on the energy detection measurements and compare the metric to a threshold to decide if there is a Bluetooth device in range.

Figure 4A:
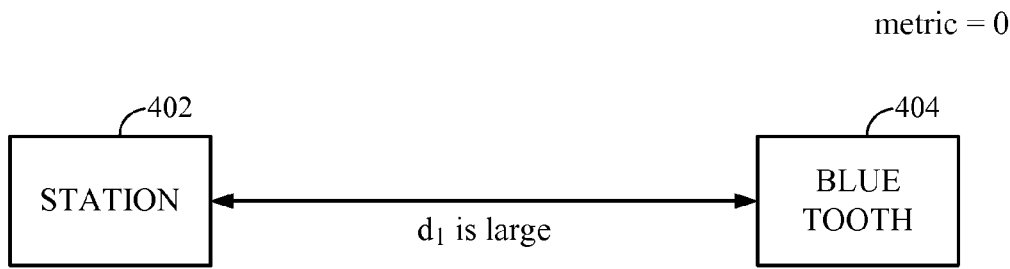
FIGS. 4A-4C illustrate example networks comprising a station and a Bluetooth transmitter, in accordance with certain embodiments of the present disclosure.
Figure 4B:
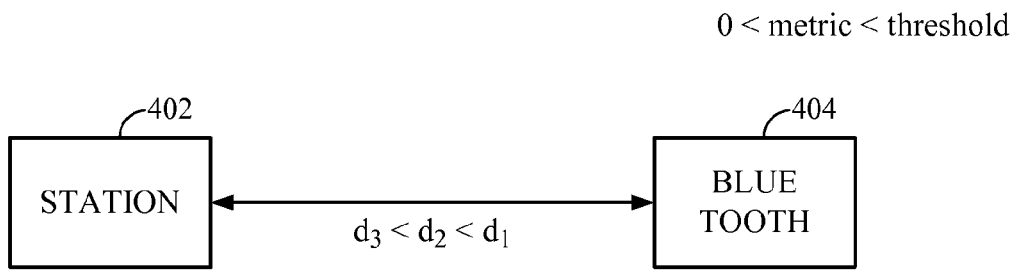
Figure 4C:
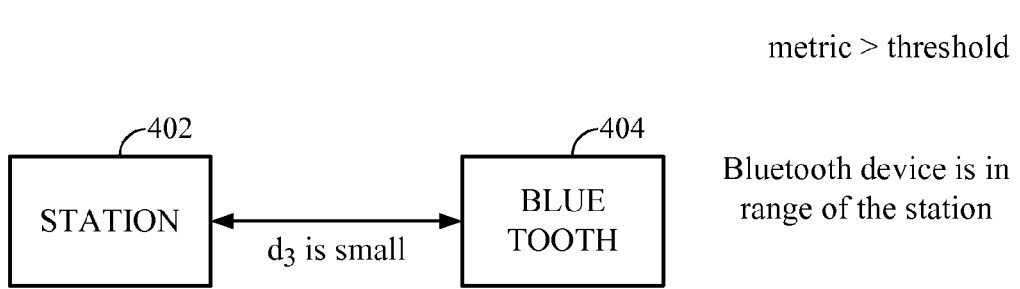

FIGS. 4A-4C illustrate example networks comprising a station 402 and a Bluetooth device 404, in accordance with certain embodiments of the present disclosure.

FIG. 4A illustrates a Bluetooth device that is far from a wireless station, therefore the signals transmitted by the station does not interfere with the signals transmitted by the Bluetooth device. As a result, a test metric may be equal to zero.

FIG. 4B illustrates a Bluetooth device that is closer to the wireless station than the Bluetooth device in FIG. 4A, but still not close enough to initiate a frequency switch from 40 MHz to 20 MHz for operation of the station in compliance with the Institute of Electrical and Electronic Engineers (IEEE) 802.11 standard. In this scenario, the test metric may still be smaller than a threshold.

FIG. 4C illustrates a Bluetooth device that is in range of a wireless station. Therefore, the station, after detecting the presence of the Bluetooth device, may switch its operative frequency to 20 MHz to reduce its interference on the Bluetooth device. In this scenario, the test statistic is larger than the threshold.

Certain embodiments of the present disclosure reliably detect the presence of a nearby Bluetooth transmitter given a sequence of power estimates, with minimal false detections on other medium-power wireless transmitters.

For certain embodiments, a sequence of power estimates are captured from the energy detection circuit. The output of the energy detector may be divided by the length of the observation period to generate signal power values. In practice, the scaling term may be combined into the threshold value, so the actual division operation may not be necessary in an implementation. In this disclosure, we consider the 'received power,' since it is more accurate.

Figure 5:
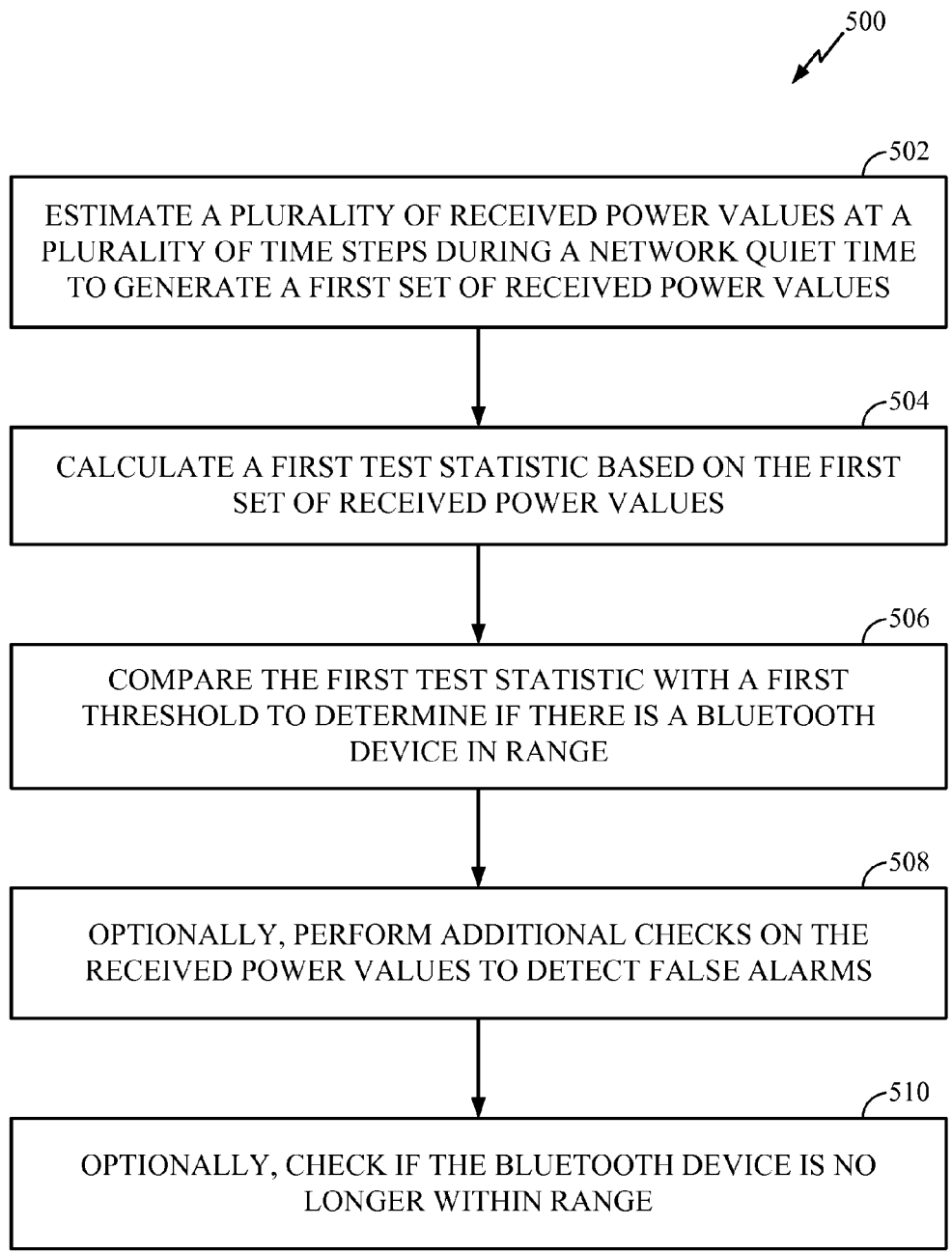
FIG. 5 illustrates example operations for detecting presence of a Bluetooth device using a sequence of energy detection measurements, in accordance with certain embodiments of the present disclosure.

FIG. 5 illustrates example operations 500 for detecting the presence, in a first radio access technology (RAT) network, of a device that communicates via a second RAT using a sequence of energy detection measurements, in accordance with certain embodiments of the present disclosure. For certain embodiments, the first RAT may be in compliance with the IEEE 802.11n standard and the second RAT may be in compliance with the Bluetooth or the IEEE 802.15.1 standard.

At 502, a plurality of received power values of transmissions via a second RAT are estimated at a plurality of time steps during a network quiet time of the first RAT network to generate a first set of received power values. At 504, a first test statistic (or test metric) is calculated based on the first set of received power values. At 506, the first test statistic is compared with a first threshold to determine if there is a device that communicates via the second RAT in range. In response to detecting the device that communicates via the second RAT in range, the first network may switch from a first operational frequency to a second operational frequency.

At 508, additional checks may be performed on the received power values to detect a false alarm. At 510, additional processing may be done to determine if the Bluetooth device is no longer within range.

For reliable detection of a nearby Bluetooth device a quiet time period in the current Wi-Fi network should be found. Each quiet period may be rather short (e.g., 3 µs). However, due to synchronization issues, it is likely that the quiet period will be a little longer than the actual observation time. A quiet time in the network may be found in different ways.

A first method for finding a quiet time in the network may be to listen to the channel immediately after completion of a packet. Since each packet is followed by an inter-frame space (SIFS) time, there is always a short quiet time after completion of each packet. The duration of the SIFS quiet time varies depending on which physical layer is used under the family of IEEE 802.11 standards. For example, in the IEEE 802.11n PHY, the short inter-frame space is equal to 16 µs. In the IEEE 802.11n, there is a reduced inter-frame space (RIFS) of 2 µs. So, it is necessary to wait until after the completion of the RIFS. If a packet is not present after the RIFS, the network should be quiet until the completion of the SIFS time, during which an energy detection measurement may be scheduled.

During the quiet time, an energy detection measurement may be scheduled knowing that the network is not transmitting. It should be noted that with the above technique, the energy detection measurements may not be made at regular intervals. However, non-regular energy detection windows do not affect the result of the proposed technique.

For certain embodiments, a quiet time in a network may be found by sending a wireless local area network (WLAN) clear-to-send (CTS) packet and not transmitting anything after that time. This may be referred to as a CTS-to-self, since the WLAN network usually sends a message enabling the transmitting station to transmit for a scheduled period of time after the CTS. In this case, the station does not transmit after the completion of the CTS, instead, the station performs energy detection measurements. This method may be useful when measuring detected energy for longer periods.

For certain embodiments, a sequence of received power estimates may be generated during the quiet time using the energy detection circuit. The observations of the channel may be either periodic or they may be scheduled as time permits. These observations are typically made over a portion of the 2.4 GHz frequency band. The energy detector may be located after the receiver filter.

In the IEEE 802.11n standard, 20 MHz and 40 MHz bandwidths are supported. The energy detection observations may be performed using one of the two bandwidths. Since the 40 MHz bandwidth is twice as wide as the 20 MHz bandwidth, it is more effective at detecting Bluetooth signals. However, the 20 MHz bandwidth may also be used. It is also possible to move the center frequency of the receiver filter to observe different portions of the frequency band. However, if the Bluetooth device is not using adaptive frequency hopping, any of the typical center frequencies may be used.

For each observation time instance, a signal power is estimated. In this disclosure, it is assumed that the signal power is converted to dBm. However, it is possible to perform all of the calculations in the linear domain without converting to dB.

The received power estimate for the $n^{th}$ observation may be calculated as follows:

$$P_n = 10*\log\left(\frac{1}{M}\sum_{m=1}^{M} y(m)y(m)^*\right)$$

in which M represents number of samples during each observation period, and y(.) represents the received signal. The sequence of received power estimates may be represented by $\{P_1, P_2, \ldots P_N\}$.

For certain embodiments, in order to determine if there is a transmitting Bluetooth device nearby, a test statistic, T, may be generated based on the sequence of received power estimates. The test statistic may be compared with a threshold. Several different test statistics may be used. A few of these statistics are presented in this document, however, other test statistics will also fall into the scope of this disclosure.

The simplest test statistic that can be used is a maximum of all the received power estimates, which may be written as follows:

$$T = \max_{n}(P_n)$$

As an alternative, the max statistic may be generalized using Order Statistics. Therefore, the received power estimates may be sorted to generate a new set $\{PS_1, PS_2, \ldots PS_N\}$ based on their size, in which $PS_1 \leq PS_2 \leq \ldots \leq PS_N$. Hence, $PS_N$ may be the largest value or the maximum received power level. An alternative to using the maximum as a test statistic is to select the $m^{th}$ received power, $PS_m$, from the sorted set. Therefore, the test statistic may be written as follows:

$$T = PS_m$$

The test statistic T may be used to choose a value from the 90 percentile of the cumulative distribution of the received power random variable. The test statistic based on the 90 percentile avoids triggering the detector on a single isolated strong power observation, which may result in a more robust detector.

As an example, if there are 20 power observations, the $18^{th}$ observation (after being sorted in an increasing order) may be selected as the test statistic, so that $T=PS_{18}$. In this example, the test statistic is the third largest received power estimate.

For certain embodiments, a test statistic may be selected based on an average of a plurality of largest received power values (i.e., $PS_m, \ldots, PS_N$), and may be written as follows:

$$T = \left(\frac{1}{N-m+1}\right)\sum_{n=m}^{N} PS_n$$

After the test statistic is calculated, the test statistic may be compared to a threshold $\gamma_1$, and a decision may be made based on whether or not the test statistic exceeds the threshold, as follows:

$$D = \begin{cases} \text{False} & \text{if } T \leq \gamma_1 \\ \text{True} & \text{if } T > \gamma_1 \end{cases}$$

Therefore, the decision (D) that there is a nearby Bluetooth transmitter is True if the test statistic exceeds the threshold, otherwise the decision is False.

For certain embodiments, it is possible to perform additional checks to eliminate false alarms.

Figure 6:
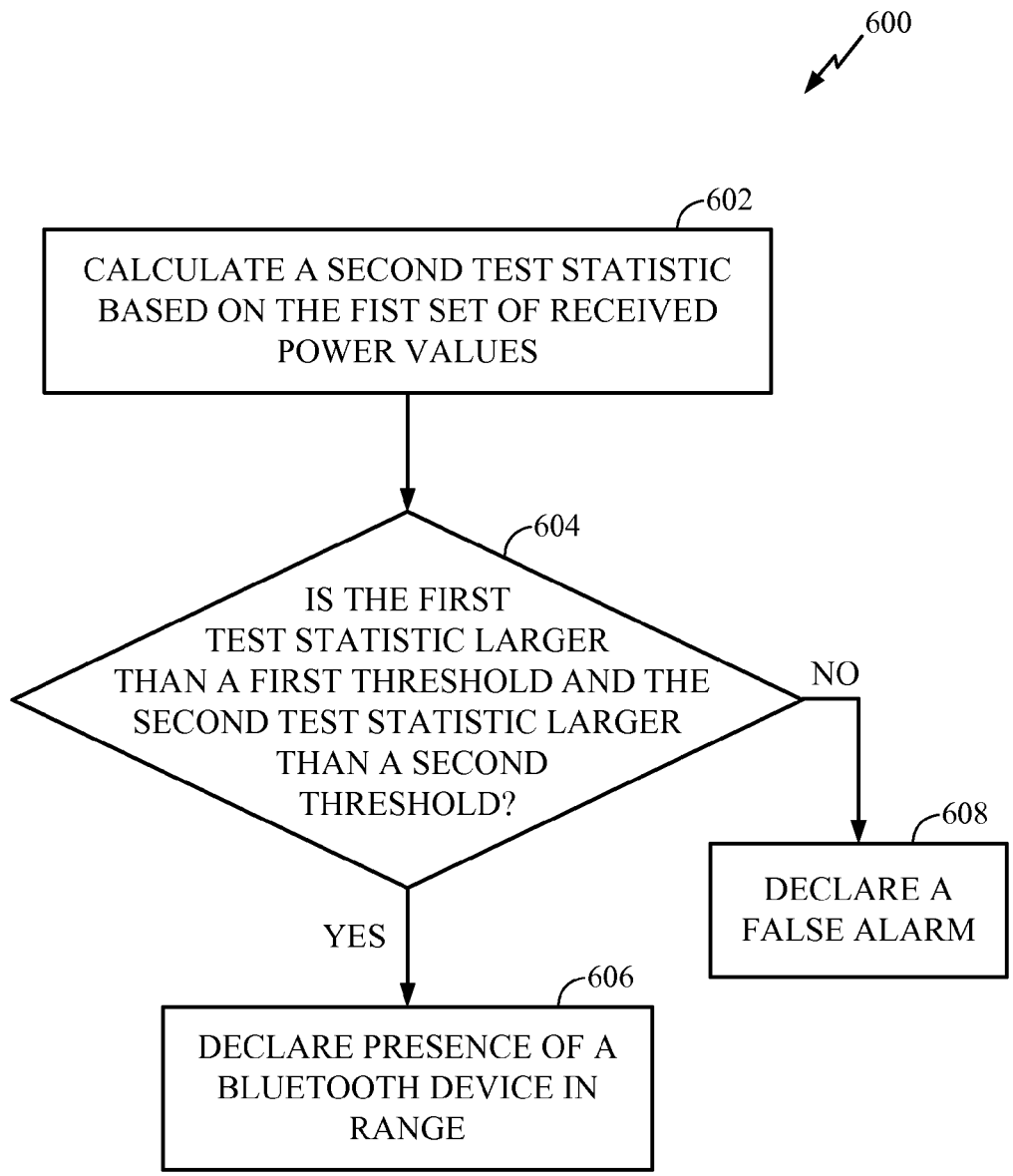
FIG. 6 illustrates example operations for reducing false alarms in detecting presence of a Bluetooth device, in accordance with certain embodiments of the present disclosure.

FIG. 6 illustrates example operations 600 for reducing false alarms in detecting presence of a Bluetooth device, in accordance with certain embodiments of the present disclosure. FIG. 6 illustrates the step 508 in FIG. 5 in more detail.

At 602, a second test statistic is calculated based on the first set of received power values. At 604, the first test statistic is compared with a first threshold and the second test statistic is compared with a second threshold. If both test statistics result in a positive decision about presence of a Bluetooth device, at 606, presence of a Bluetooth device in range is declared. If one of the test statistics results in a negative decision about presence of a Bluetooth device, at 608, a false alarm is declared.

If the first test statistic results in a positive decision, an additional check may be performed on the observed values based on the time domain correlation of the original received power sequence $\{P_1, P_2, \ldots P_N\}$. If the observation period is less than the Bluetooth hopping period (e.g., 625 µs), there may be a time correlation between the received power estimates. The second test statistic may be defined as the time correlation with an offset of one observation period by calculating the mean m of the power estimates and calculating the variance $\sigma^2$ of the power estimates, as follows:

$$m = \frac{1}{N}\sum_{n=1}^{N} P_n$$

$$\sigma^2 = \frac{1}{N}\sum_{n=1}^{N} (P_n - m)^2$$

The autocorrelation r with an offset of one observation may be calculated as follows:

$$r(1) = \frac{1}{N-1}\sum_{n=1}^{N-1} (P_n - m)(P_{n+1} - m)$$

For certain embodiments, the test statistic may be the correlation coefficient $$T' = \frac{r(1)}{\sigma^2}.$$

This test statistic may be compared to another threshold γ' which may be a number between zero and one. If the correlation coefficient is small, the decision may be changed to False as follows:

If T'<γ' Then D=False

If the test statistic exceeds the threshold, the decision stays as True.

For certain embodiments, once a Bluetooth device has been detected and the 802.11n network has changed to 20 MHz operation, the 802.11n network should not stay in the 20 MHz mode of operation forever. If the Bluetooth device leaves the region, the 802.11n may switch back to the 40 MHz mode.

Figure 7:
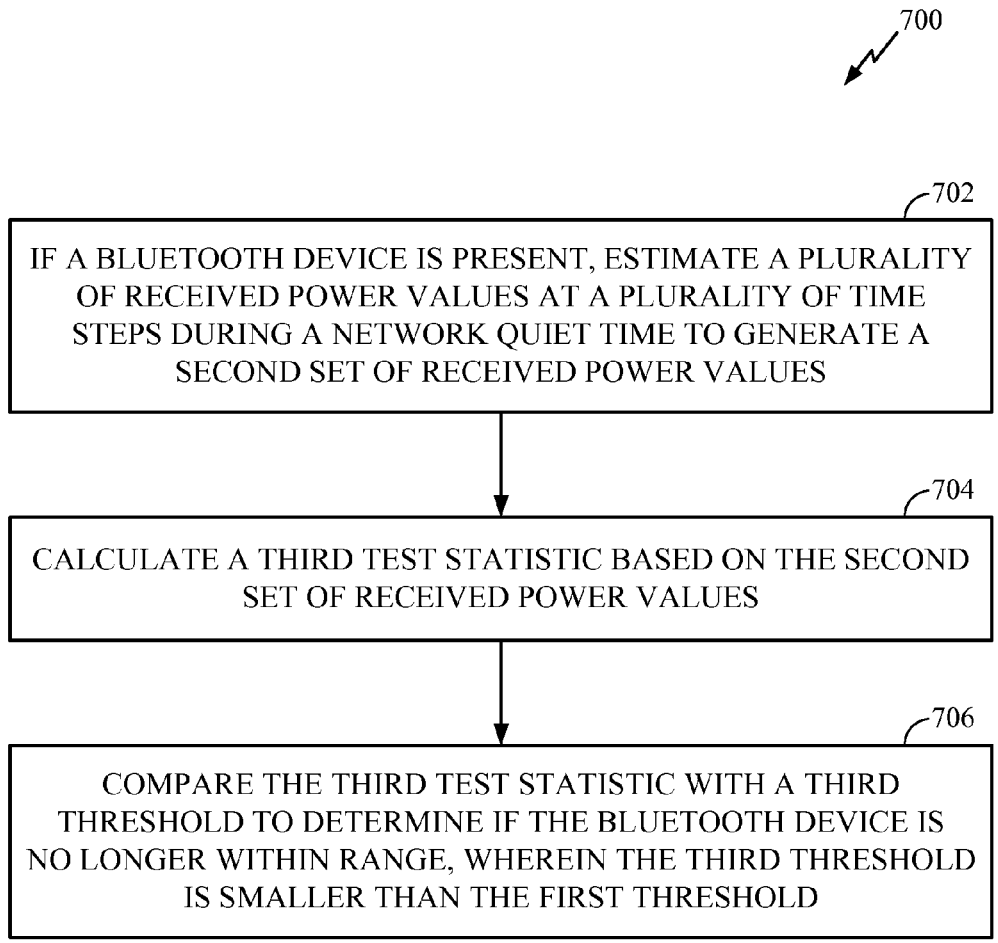
FIG. 7 illustrates example operations for detecting if a Bluetooth device is no longer within range after detection of a Bluetooth device, in accordance with certain embodiments of the present disclosure.

FIG. 7 illustrates example operations 700 for detecting if a Bluetooth device is no longer within range after detection of a Bluetooth device, in accordance with certain embodiments of the present disclosure. FIG. 7 illustrates the step 510 in FIG. 5 in more detail.

At 702, if the Bluetooth device was previously in range, a plurality of received power values are estimated at a plurality of time steps during another network quiet time to generate a second set of received power values. At 704, a third test statistic is calculated based on the second set of received power values. The third test statistic may be calculated using one of the methods described above.

At 706, the third test statistic is compared with a third threshold to determine if the Bluetooth device is no longer within range, wherein the third threshold may be smaller than the first threshold (i.e., $\gamma_2 \leq \gamma_1$). For example, the first threshold may be −40 dBm while the third threshold may be −45 dBm.

$$D = \begin{cases} \text{False} & \text{if } T_2 \leq \gamma_2 \\ \text{True} & \text{if } T_2 > \gamma_2 \end{cases}$$

If the test statistic is less than the third threshold, the decision is that Bluetooth transmitter is no longer present, while if the test statistic exceeds the third threshold, it means that the Bluetooth transmitter is still present.

Simulation Results

In this section, a simulation environment and simulation results are presented using the proposed scheme for detecting presence of a Bluetooth device in range of a station. It is assumed that two Bluetooth devices are nearby a Wi-Fi station. The Bluetooth devices are close enough to the STA so that the received power at the STA is high. In this simulation, the received power at the STA is −35 dBm from one of the Bluetooth devices and −50 dBm from the other Bluetooth device. This simulation is modeling a small Bluetooth piconet, with one device being farther from the STA than the other. This could represent a cell phone in someone's pocket and a Bluetooth headset.

The duty cycle of the Bluetooth is varied between 33% and 100%. The simulation of Bluetooth is without adaptive frequency hopping (AFH). Since the Bluetooth devices without AFH may be impacted by the Wi-Fi interference more than the Bluetooth devices that support AFH. Therefore, it is very important to be able to detect those Bluetooth piconets that do not support AFH.

The STA has a receiver bandwidth of either 20 MHz or 40 MHz. Simulation results are given for both cases. The performance of the 40 MHz version is superior. The Wi-Fi STA uses a standard energy detection circuit which samples the filtered signal and estimates the signal power. In this simulation, the time period over which the samples are collected is 4 μs. The energy detection occurs on a periodic basis every 100 μs.

The test statistic is assumed to be a maximum of the power estimates, $$T = \max_n (P_n)$$

and is compared to the threshold value of −40 dBm. Two different channel models are supported in the simulation, such as additive white Gaussian noise (AWGN) channel and multipath channel.

Figure 8:
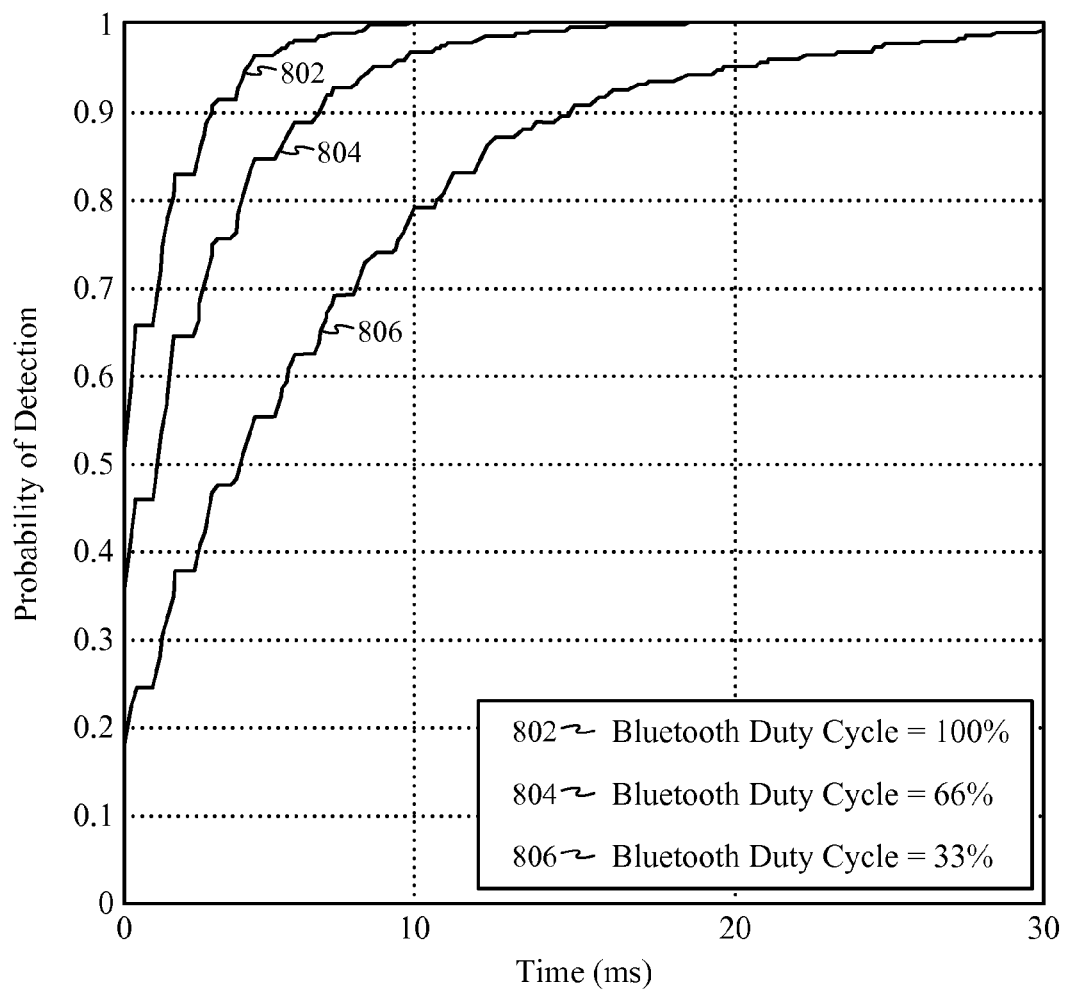
FIG. 8 illustrates probability of detection using a 40 MHz Wi-Fi receiver in an additive white Gaussian noise (AWGN) channel, in accordance with certain embodiments of the present disclosure.

FIG. 8 illustrates probability of detection using a 40 MHz Wi-Fi receiver in an AWGN channel, in accordance with certain embodiments of the present disclosure. The curve 802 shows the probability of detection when the duty cycle of the Bluetooth device is 100%. The curves 804 and 806 show the probability of detection when the Bluetooth duty cycles are 66% and 33%, respectively. The lower the Bluetooth duty cycle, the longer it takes to obtain reliable detection.

Figure 9:
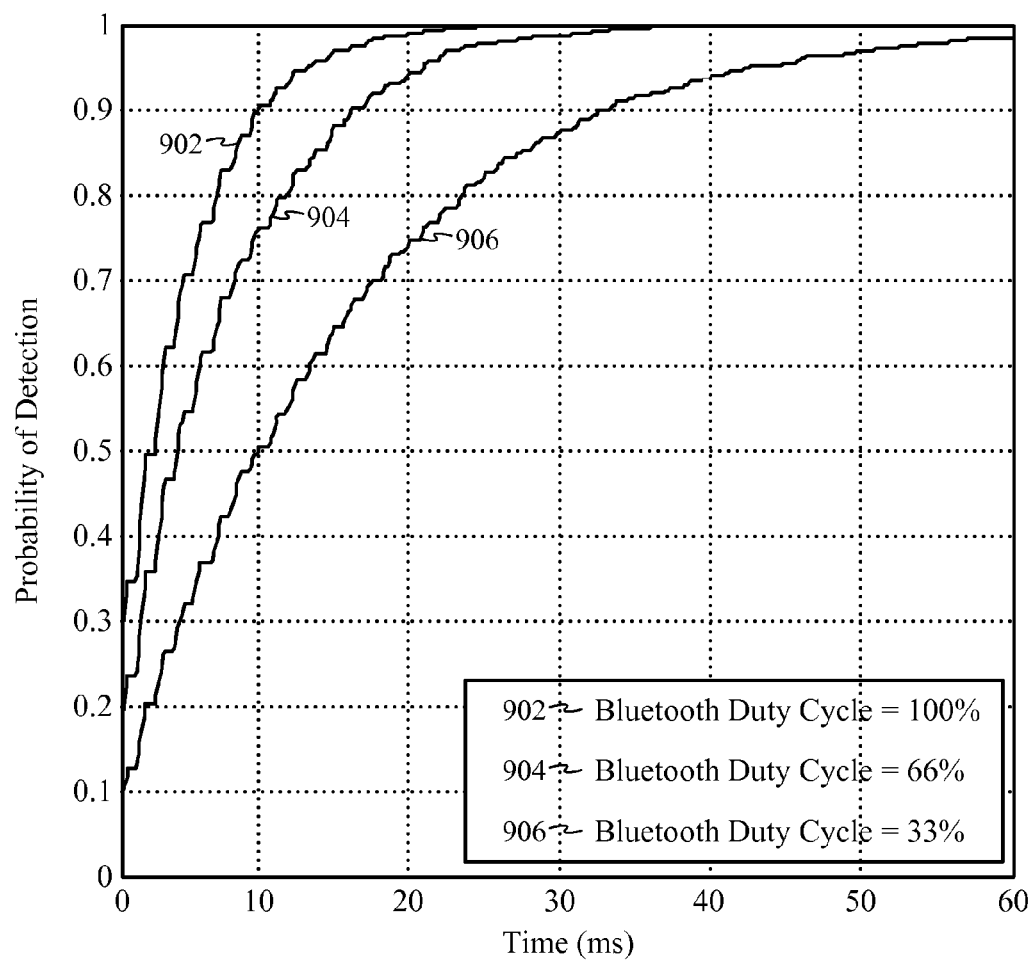
FIG. 9 illustrates probability of detection using a 20 MHz Wi-Fi receiver in an AWGN channel, in accordance with certain embodiments of the present disclosure.

FIG. 9 illustrates probability of detection using a 20 MHz Wi-Fi receiver in an AWGN channel, in accordance with certain embodiments of the present disclosure. The curves 902, 904 and 906 show the probability of detection when the Bluetooth duty cycles are 100%, 66% and 33%, respectively. As expected, the required time to obtain reliable detection is twice as long when a 20 MHz filter is used compared to a system using a 40 MHz filter.

The next set of simulations utilizes a multipath channel. An exponential delay spread model was used with a root mean square (RMS) delay spread of 100 ns. This multipath channel is between the Bluetooth piconet and the Wi-Fi station. This represents a large delay spread for such a channel since the devices will be quite close based on the detector threshold. Therefore, the simulation represents a worst case scenario.

Figure 10:
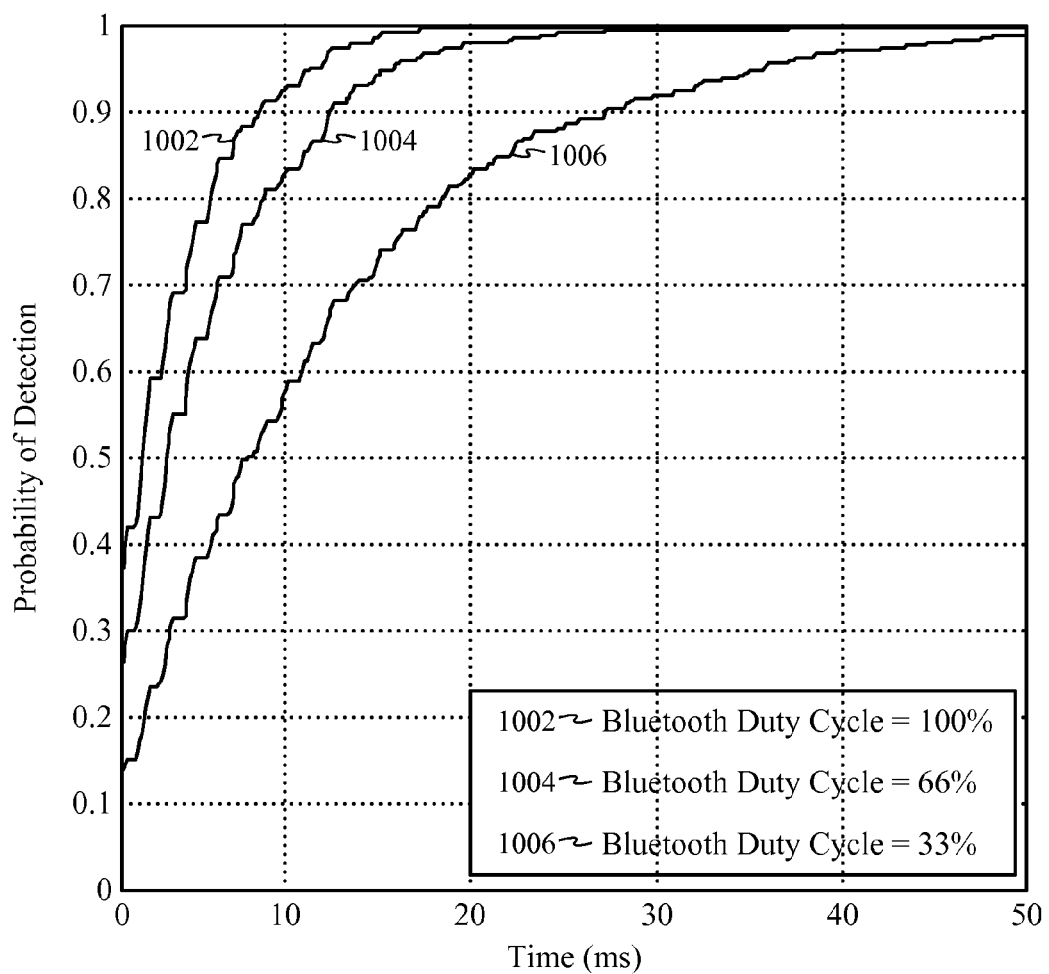
FIG. 10 illustrates probability of detection using a 40 MHz Wi-Fi receiver in a multipath channel, in accordance with certain embodiments of the present disclosure.

FIG. 10 illustrates probability of detection using a 40 MHz Wi-Fi receiver in a multipath channel, in accordance with certain embodiments of the present disclosure. The curves 1002, 1004 and 1006 show the probability of detection when the Bluetooth duty cycles are 100%, 66% and 33%, respectively. The time required to detect Bluetooth in a multipath channel is approximately twice as long as the time required in a similar system using an AWGN channel.

Figure 11:
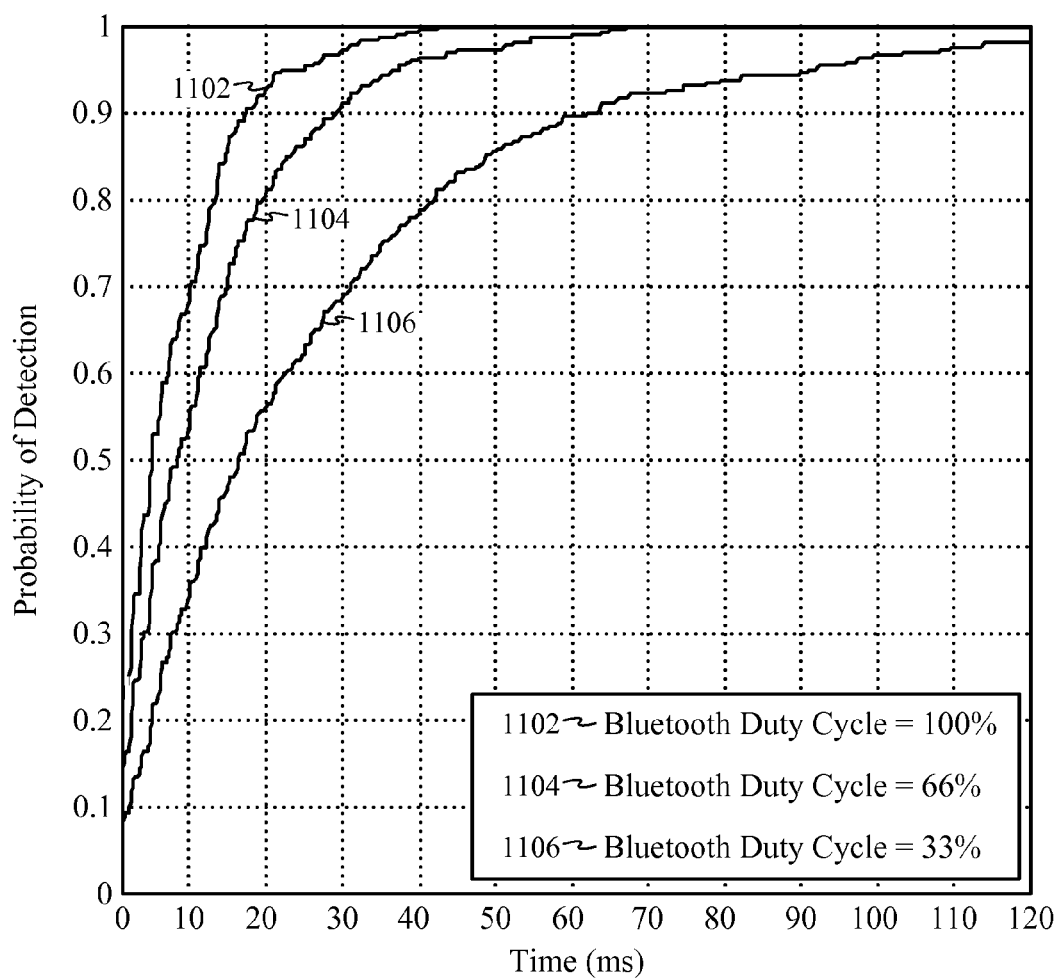
FIG. 11 illustrates probability of detection using a 20 MHz Wi-Fi receiver in a multipath channel, in accordance with certain embodiments of the present disclosure.

FIG. 11 illustrates probability of detection using a 20 MHz Wi-Fi receiver in a multipath channel, in accordance with certain embodiments of the present disclosure. The curves 1102, 1104 and 1106 show the probability of detection when the Bluetooth duty cycles are 100%, 66% and 33%, respectively. Comparing to FIG. 9, the time required to detect Bluetooth in the multipath channel is approximately twice as long as the time required in a similar system using an AWGN channel.

The embodiments described in the present disclosure provide a method for reliable detection of a Bluetooth piconet nearby a station using the standard energy detection circuit.

Figure 5A:
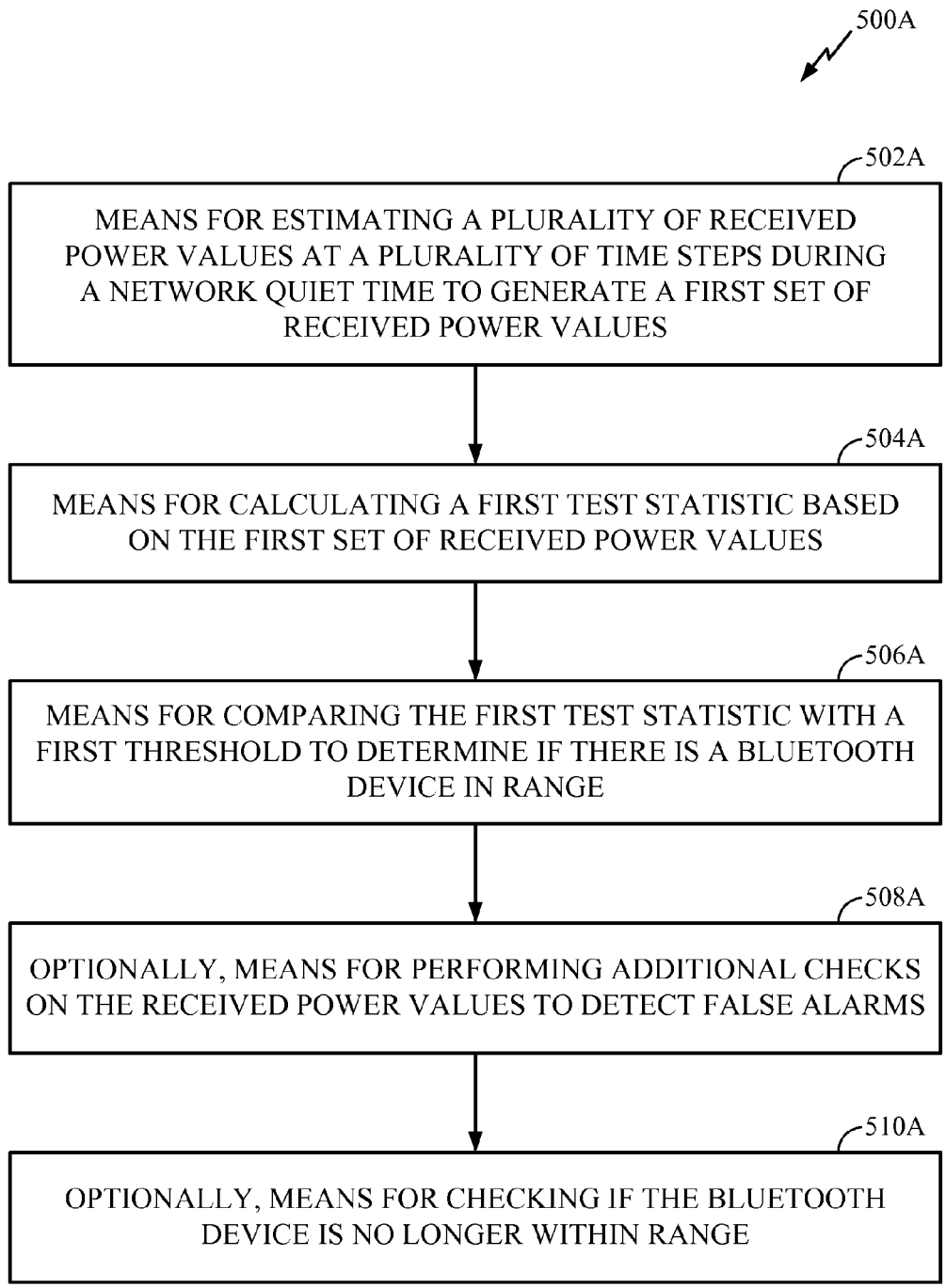
FIG. 5A illustrates example components capable of performing the operations illustrated in FIG. 5.
Figure 6A:
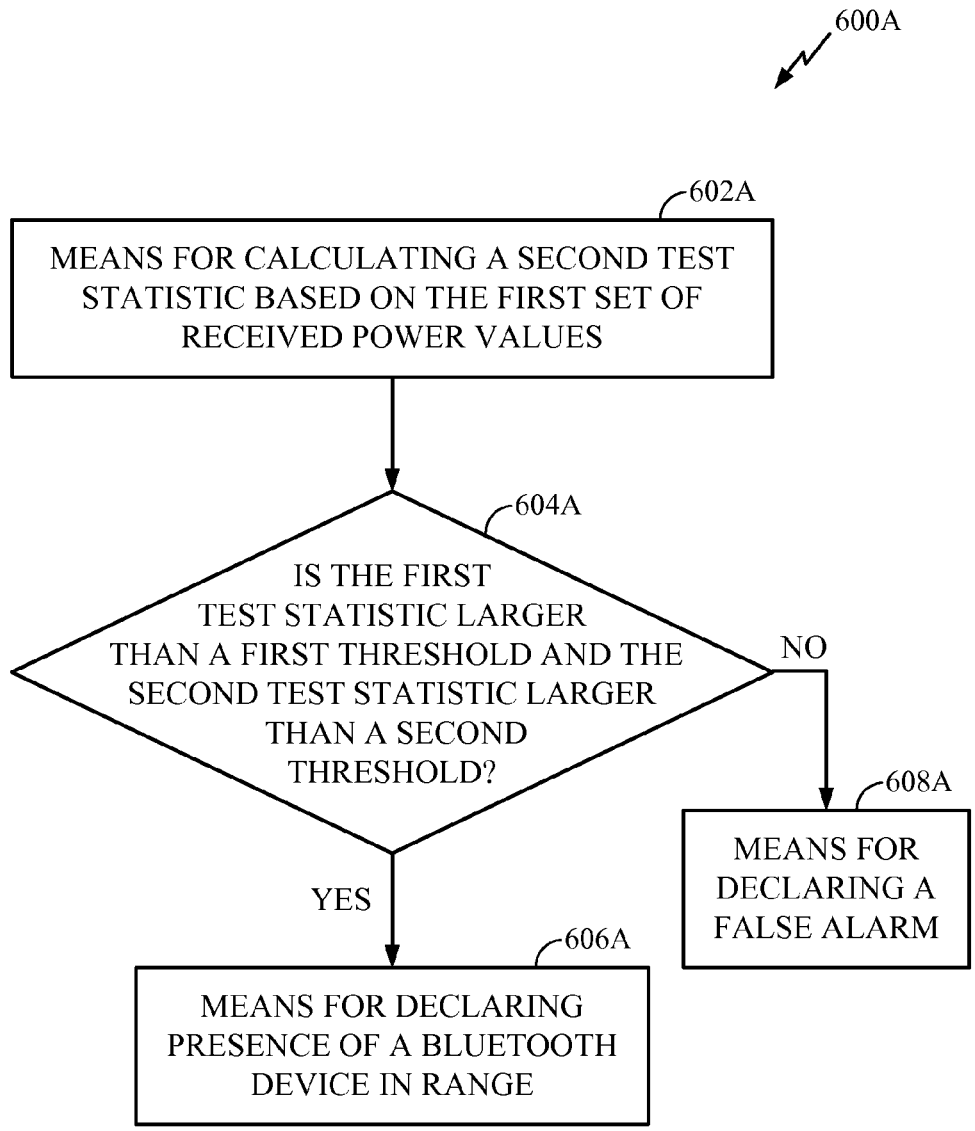
FIG. 6A illustrates example components capable of performing the operations illustrated in FIG. 6.
Figure 7A:
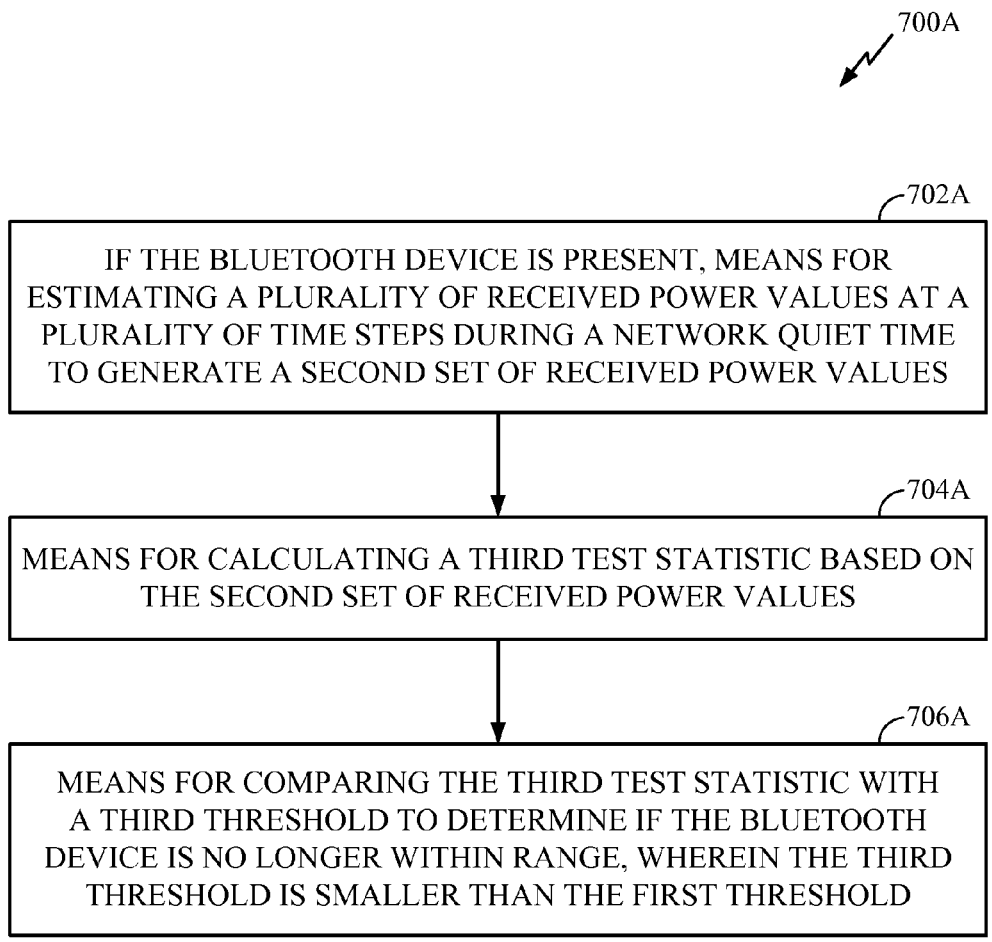
FIG. 7A illustrates example components capable of performing the operations illustrated in FIG. 7.

The various operations of methods described above may be performed by various hardware and/or software component (s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, operations 500, 600 and 700 illustrated in FIGS. 5, 6 and 7 all correspond to means-plus-function blocks 500A, 600A, and 700A illustrated in FIGS. 5A, 6A and 7A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals and the like that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated in the Figures, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims While the foregoing is directed to embodiments of the present disclosure, other and further embodiments of the disclosure may be devised without departing from the basic scope thereof, and the scope thereof is determined by the claims that follow.

The invention claimed is:

1. A method for detecting the presence, in a first radio access technology (RAT) network, of a device that communicates via a second RAT, comprising:

estimating a plurality of received power values of transmissions via the second RAT at a plurality of time steps during a network quiet time of the first RAT network to generate a first set of received power values;

calculating a first test statistic based on the first set of received power values, wherein the first test statistic comprises a mean of a plurality of a selected received power values of the first set of received power values having the highest values;

comparing, by a processor, the first test statistic with a first threshold to determine if the device that communicates via the second RAT is in range; and in response to determining the device that communicates via the second RAT is in range, switching from a first operational frequency to a second operational frequency.

2. The method of claim 1, wherein the first RAT is in compliance with the Institute of Electrical and Electronics Engineers (IEEE) 802.11n standard.

3. The method of claim 1, wherein the second RAT is in compliance with the Institute of Electrical and Electronics Engineers (IEEE) 802.15.1 (Bluetooth) standard.

4. The method of claim 1, wherein the first operational frequency corresponds to a 40 MHz bandwidth and the second operational frequency corresponds to a 20 MHz bandwidth.

5. The method of claim 1, further comprising:
calculating a second test statistic based on the first set of received power values; and
comparing the second test statistic with a second threshold.

6. The method of claim 5, further comprising:
declaring presence of the device that communicates via the second RAT in range if the first test statistic is larger than the first threshold and the second test statistic is larger than the second threshold.

7. The method of claim 5, further comprising:
declaring a false alarm if the first test statistic is larger than the first threshold but the second test statistic is equal to or smaller than the second threshold.

8. The method of claim 1, further comprising:
estimating a plurality of received power values of transmissions via the second RAT at a plurality of time steps during another network quiet time of the first RAT to generate a second set of received power values, if the device that communicates via the second RAT was previously in range;
calculating a third test statistic based on the second set of received power values; and
comparing the third test statistic with a third threshold to determine if the device that communicates via the second RAT is no longer within range, wherein the third threshold is smaller than the first threshold.

9. The method of claim 8, further comprising:
in response to detecting the device that communicates via the second RAT is no longer within range, switching from the second operational frequency back to the first operational frequency.

10. The method of claim 5, wherein the second test statistic is based on a time domain correlation of the received power values.

11. An apparatus for detecting the presence, in a first radio access technology (RAT) network, of a device that communicates via a second RAT, comprising:
means for estimating a plurality of received power values of transmissions via the second RAT at a plurality of time steps during a network quiet time of the first RAT network to generate a first set of received power values;
means for calculating a first test statistic based on the first set of received power values, wherein the first test statistic comprises a mean of a plurality of a selected received power values of the first set of received power values having the highest values; means for comparing the first test statistic with a first threshold to determine if the device that communicates via the second RAT is in range; and
means for switching from a first operational frequency to a second operational frequency in response to determining that the device that communicates via the second RAT is in range.

12. The apparatus of claim 11, wherein the first RAT is in compliance with the Institute of Electrical and Electronics Engineers (IEEE) 802.11n standard.

13. The apparatus of claim 11, wherein the second RAT is in compliance with the Institute of Electrical and Electronics Engineers (IEEE) 802.15.1 (Bluetooth) standard.

14. The apparatus of claim 11, wherein the first operational frequency corresponds to a 40 MHz bandwidth and the second operational frequency corresponds to a 20 MHz bandwidth.

15. The apparatus of claim 11, further comprising:
means for calculating a second test statistic based on the first set of received power values; and
means for comparing the second test statistic with a second threshold.

16. The apparatus of claim 15, further comprising:
means for declaring presence of the device that communicates via the second RAT in range if the first test statistic is larger than the first threshold and the second test statistic is larger than the second threshold.

17. The apparatus of claim 15, further comprising:
means for declaring a false alarm if the first test statistic is larger than the first threshold but the second test statistic is equal or smaller than the second threshold.

18. The apparatus of claim 11, further comprising:
means for estimating a plurality of received power values of transmissions via the second RAT at a plurality of time steps during another network quiet time of the first RAT to generate a second set of received power values, if the device that communicates via the second RAT was previously in range;
means for calculating a third test statistic based on the second set of received power values; and
means for comparing the third test statistic with a third threshold to determine if the device that communicates via the second RAT is no longer within range, wherein the third threshold is smaller than the first threshold.

19. The apparatus of claim 18, further comprising:
in response to detecting the device that communicates via the second RAT is no longer within range, means for switching from the second operational frequency back to the first operational frequency.

20. The apparatus of claim 11, wherein the means for comparing the first test statistic with a first threshold to determine if the device that communicates via the second RAT is in range comprises a processor.

21. An apparatus for detecting the presence, in a first radio access technology (RAT) network, of a device that communicates via a second RAT, comprising:
at least one processor configured to:
estimate a plurality of received power values of transmissions via the second RAT at a plurality of time steps during a network quiet time of the first RAT network to generate a first set of received power values;
calculate a first test statistic based on the first set of received power values, wherein the first test statistic comprises a mean of a plurality of a selected received power values of the first set of received power values having the highest values;
compare the first test statistic with a first threshold to determine if the device that communicates via the second RAT is in range; and
switch from a first operational frequency to a second operational frequency in response to determining the device that communicates via the second RAT is in range; and
a memory coupled to the at least one processor.

22. The apparatus of claim 21, wherein the first RAT is in compliance with the Institute of Electrical and Electronics Engineers (IEEE) 802.11n standard.

23. The apparatus of claim 21, wherein the second RAT is in compliance with the Institute of Electrical and Electronics Engineers (IEEE) 802.15.1 (Bluetooth) standard.

24. The apparatus of claim 21, wherein the first operational frequency corresponds to a 40 MHz bandwidth and the second operational frequency corresponds to a 20 MHz bandwidth.

25. The apparatus of claim 21, wherein the processor is further configured to:
calculate a second test statistic based on the first set of received power values; and
compare the second test statistic with a second threshold.

26. The apparatus of claim 25, wherein the processor is further configured to:
declare presence of the device that communicates via the second RAT in range if the first test statistic is larger than the first threshold and the second test statistic is larger than the second threshold.

27. The apparatus of claim 25, wherein the processor is further configured to:
declare a false alarm if the first test statistic is larger than the first threshold but the second test statistic is equal or smaller than the second threshold.

28. The apparatus of claim 21, wherein the processor is further configured to:
estimate a plurality of received power values of transmissions via the second RAT at a plurality of time steps during another network quiet time of the first RAT to generate a second set of received power values, if the device that communicates via the second RAT was previously in range;
calculate a third test statistic based on the second set of received power values; and
compare the third test statistic with a third threshold to determine if the device that communicates via the second RAT is no longer within range, wherein the third threshold is smaller than the first threshold.

29. The apparatus of claim 28, wherein the processor is further configured to:
in response to detecting the device that communicates via the second RAT is no longer within range, switch from the second operational frequency back to the first operational frequency.

30. The apparatus of claim 25, wherein the second test statistic is based on a time domain correlation of the received power values.

31. A non-transitory computer readable medium for detecting the presence, in a first radio access technology (RAT) network, of a device that communicates via a second RAT, the computer readable medium having instructions stored thereon, the instructions being executable by one or more processors and the instructions comprising:
instructions for estimating a plurality of received power values of transmissions via the second RAT at a plurality of time steps during a network quiet time of the first RAT network to generate a first set of received power values;
instructions for calculating a first test statistic based on the first set of received power values, wherein the first test statistic comprises a mean of a plurality of a selected received power values of the first set of received power values having the highest values;
instructions for comparing the first test statistic with a first threshold to determine if the device that communicates via the second RAT is in range; and
instructions for switching from a first operational frequency to a second operational frequency in response to determining the device that communicates via the second RAT is in range.

32. The computer readable medium of claim 31, wherein the first RAT is in compliance with the Institute of Electrical and Electronics Engineers (IEEE) 802.11n standard.

33. The computer readable medium of claim 31, wherein the second RAT is in compliance with the Institute of Electrical and Electronics Engineers (IEEE) 802.15.1 (Bluetooth) standard.

34. The computer readable medium of claim 31, wherein the first operational frequency corresponds to a 40 MHz bandwidth and the second operational frequency corresponds to a 20 MHz bandwidth.

35. The computer readable medium of claim 31, further comprising:
instructions for calculating a second test statistic based on the first set of received power values; and
instructions for comparing the second test statistic with a second threshold.

36. The computer readable medium of claim 35, further comprising:
instructions for declaring presence of the device that communicates via the second RAT in range if the first test statistic is larger than the first threshold and the second test statistic is larger than the second threshold.

37. The computer readable medium of claim 35, further comprising:
instructions for declaring a false alarm if the first test statistic is larger than the first threshold but the second test statistic is equal or smaller than the second threshold.

38. The computer readable medium of claim 31, further comprising:
instructions for estimating a plurality of received power values of transmissions via the second RAT at a plurality of time steps during another network quiet time of the first RAT to generate a second set of received power values, if the device that communicates via the second RAT was previously in range;
instructions for calculating a third test statistic based on the second set of received power values; and
instructions for comparing the third test statistic with a third threshold to determine if the device that communicates via the second RAT is no longer within range, wherein the third threshold is smaller than the first threshold.

39. The computer readable medium of claim 38, further comprising:
in response to detecting the device that communicates via the second RAT is no longer within range, instructions for switching from the second operational frequency back to the first operational frequency.

40. The computer readable medium of claim 35, wherein the second test statistic is based on a time domain correlation of the received power values.

* * * * *